(12) United States Patent
Pal

(10) Patent No.: US 10,305,261 B2
(45) Date of Patent: May 28, 2019

(54) POWER DISTRIBUTION SYSTEM

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 172 days.

(21) Appl. No.: 15/080,686

(22) Filed: Mar. 25, 2016

(65) Prior Publication Data

US 2017/0279250 A1    Sep. 28, 2017

(51) Int. Cl.
| | |
|---|---|
| *H02B 1/04* | (2006.01) |
| *H01H 1/20* | (2006.01) |
| *H01H 1/22* | (2006.01) |
| *H01H 9/40* | (2006.01) |
| *H01H 50/14* | (2006.01) |
| *H01H 50/54* | (2006.01) |
| *H01H 45/04* | (2006.01) |
| *H01H 51/27* | (2006.01) |
| *H02B 1/20* | (2006.01) |

(52) U.S. Cl.
CPC ............. *H02B 1/04* (2013.01); *H01H 1/2025* (2013.01); *H01H 1/226* (2013.01); *H01H 9/40* (2013.01); *H01H 45/04* (2013.01); *H01H 50/14* (2013.01); *H01H 50/546* (2013.01); *H01H 51/27* (2013.01); *H02B 1/20* (2013.01)

(58) Field of Classification Search
CPC . H02B 1/04; H02B 1/20; H02B 1/056; H02B 1/56; H01H 45/04; H01H 51/27; H01H 1/62; H01H 2009/523; H01H 2009/526; H01H 3/264; H01H 50/14; H01H 9/40; H01H 50/546; H01H 3/26
USPC ...... 200/243, 17 R, 329, 293, 275; 439/188; 335/202

See application file for complete search history.

(56) References Cited

U.S. PATENT DOCUMENTS

| | | | |
|---|---|---|---|
| 8,537,518 B2 * | 9/2013 | Morris .................. | H01H 3/26 200/308 |
| 9,142,364 B2 * | 9/2015 | Pal ........................ | H01H 1/62 |
| 9,153,946 B2 * | 10/2015 | Pal ....................... | H02B 1/056 |
| 2009/0288935 A1 | 11/2009 | Larcher et al. | |

(Continued)

FOREIGN PATENT DOCUMENTS

| | | |
|---|---|---|
| DE | 10009499 C1 | 9/2001 |
| JP | 2005222871 A | 8/2005 |

OTHER PUBLICATIONS

European Search Report for European Patent Application No. 17162502.3 dated Jul. 27, 2017, 10 pages.

*Primary Examiner* — Edwin A. Leon
(74) *Attorney, Agent, or Firm* — Cantor Colburn LLP

(57) ABSTRACT

A power distribution system includes an electrical contactor arrangement. The electrical contactor arrangement includes a first contactor post, a first contactor lead, and a second contactor lead. The first contactor post extends from a first bus bar. The first contactor lead extends from the first contactor post. The first contactor lead is at least partially received within a contactor housing. The second contactor lead is spaced apart from the first contactor lead and extends from the first contactor post. The second contactor lead is at least partially received within the contactor housing.

11 Claims, 4 Drawing Sheets

(56) References Cited

U.S. PATENT DOCUMENTS

2013/0257569 A1* 10/2013 Pal ...................... H01H 50/043
　　　　　　　　　　　　　　　　　　　　335/202

* cited by examiner

POWER DISTRIBUTION SYSTEM

BACKGROUND

The present disclosure relates to a power distribution system having an electrical contactor arrangement.

Commercial aircraft include onboard power systems that include a power generation system and a power distribution system. The power generation system and the power distribution system are used to generate and distribute power during operation of the aircraft. The power distribution system includes electrical contactors that control the flow of current into a bus bar and are mechanically switch on or off as needed by onboard electronic systems. The electrical contactors generate heat during operation and the heat is dissipated generally by natural convection.

BRIEF DESCRIPTION

According to an embodiment of the present disclosure, a power distribution system is provided. The power distribution system includes an electrical contactor arrangement. The electrical contactor arrangement includes a first contactor post, a first contactor lead, and a second contactor lead. The first contactor post extends from a first bus bar. The first contactor lead extends from the first contactor post. The first contactor lead is at least partially received within a contactor housing. The second contactor lead is spaced apart from the first contactor lead and extends from the first contactor post. The second contactor lead is at least partially received within the contactor housing.

According to another embodiment of the present disclosure, an electrical contactor arrangement is provided. The electrical contactor arrangement includes an actuator assembly, a first movable contact, and a second movable contact. The actuator assembly is disposed within a contactor housing. The actuator assembly includes an actuator and an arm extending from the actuator. The arm includes a first portion and a second portion. The first movable contact is coupled to the first portion of the arm. The second movable contact is coupled to the second portion of the arm.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
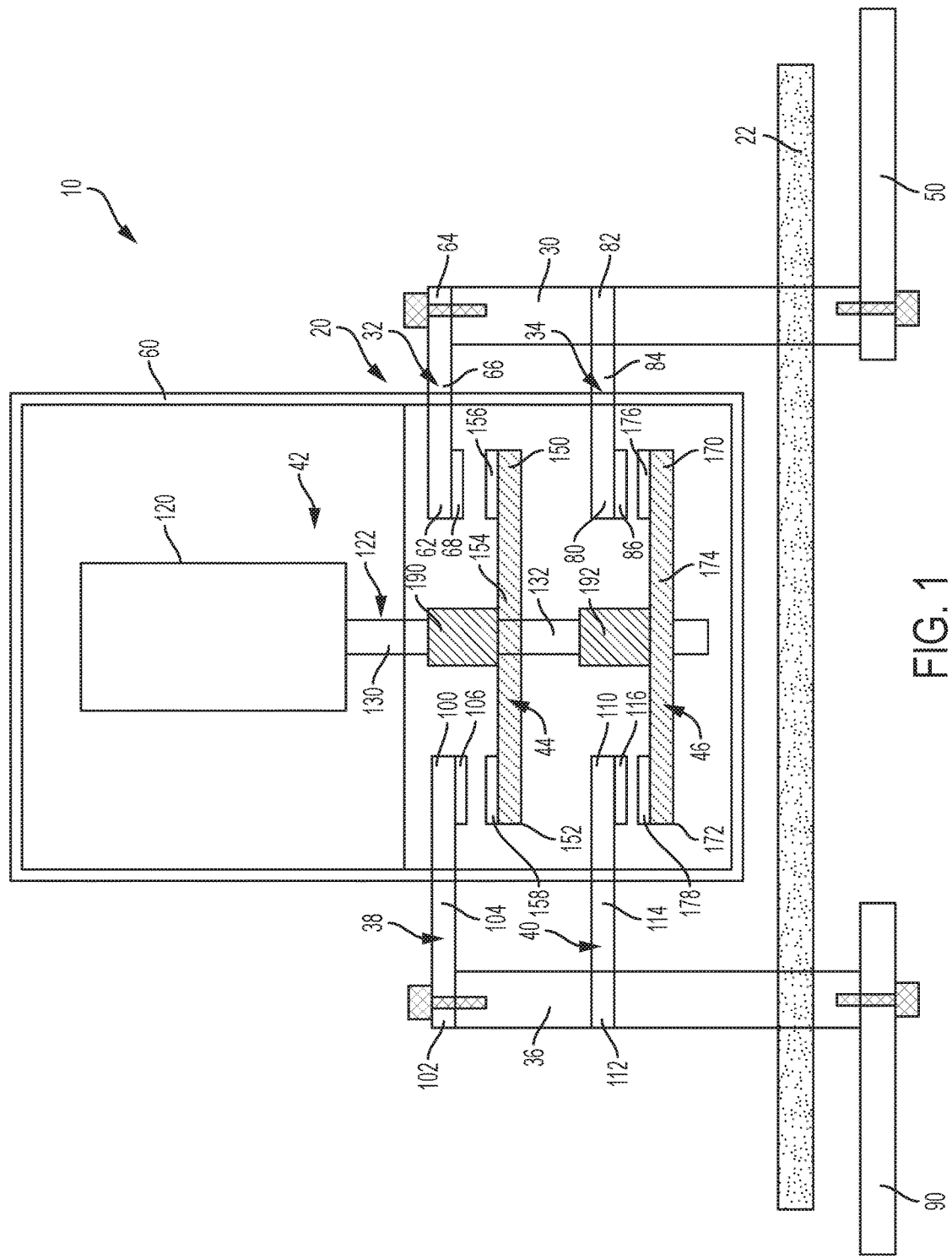
FIG. 1 schematically illustrates a power distribution system having an electrical contactor arrangement in an open position.

Referring to FIG. 1, a power distribution system 10 is shown. The power distribution system 10 is provided with an aircraft. The power distribution system 10 enables the selective distribution of electrical power from a power generation system to various systems of the aircraft that consume electricity. The power distribution system 10 includes an electrical contactor arrangement 20 connected to a power distribution panel 22. The power distribution panel 22 is configured to mount multiple power distribution components and a centralized location.

Figure 2:
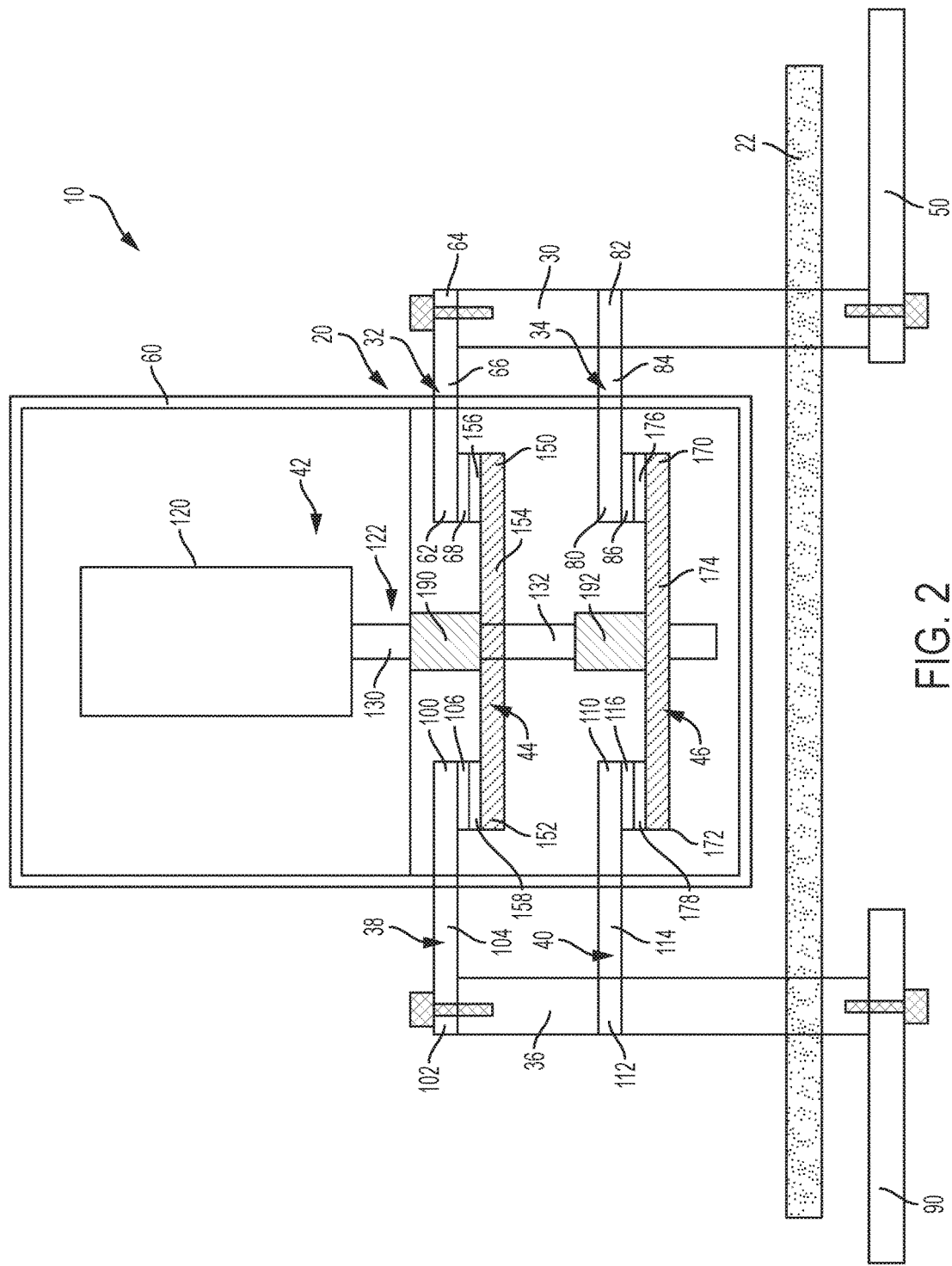
FIG. 2 schematically illustrates the power does vision system having the electrical contactor arrangement in a closed position.

The electrical contactor arrangement 20 distributes electric power to multiple onboard electric systems as needed. The electrical contactor arrangement includes a first contactor post 30, a first contactor lead 32, a second contactor lead 34, a second contactor post 36, a third contactor lead 38, a fourth contactor lead 40, an actuator assembly 42, a first movable contact 44, and a second movable contact 46. The electrical contactor arrangement 20 is movable between an open position, as shown in FIG. 1, and a closed position, as shown in FIG. 2.

The first contactor post 30 is connected to and extends from a first bus bar 50 that is connected to the power distribution panel 22. The first contactor post 30 is disposed substantially perpendicular to the first bus bar 50.

The first contactor lead 32 is connected to the first contactor post 30. The first contactor lead 32 extends from the first contactor post 30 towards a first side of a contactor housing 60. The first contactor lead 32 extends into and is at least partially received within the contactor housing 60. The first contactor lead 32 includes a first contactor lead first end 62, a first contactor lead second end 64, and a first contactor lead body 66 extending between the first contactor lead first end 62 and the first contactor lead second end 64.

The first contactor lead first end 62 is received within the contactor housing 60. The first contactor lead second end 64 is connected to the first contactor post 30. A first contactor pad 68 is disposed on the first contactor lead 32 proximate the first contactor lead first end 62.

The second contactor lead 34 is connected to the first contactor post 30. The second contactor lead 34 is spaced apart from the first contactor lead 32. The second contactor lead 34 extends from the first contactor post 30 towards the first side of the contactor housing 60. The second contactor lead 34 extends into and is at least partially received within the contactor housing 60. The second contactor lead 34 includes a second contactor lead first end 80, a second contactor lead second end 82, and a second contactor lead body 84 extending between the second contactor lead first end 80 and the second contactor lead second end 82.

The second contactor lead first end 80 is received within the contactor housing 60. The second contactor lead second end 82 is connected to the first contactor post 30. A second contactor pad 86 is disposed on the second contactor lead 34 proximate the second contactor lead first end 80.

The second contactor post 36 is connected to and extends from a second bus bar 90 connected to the power distribution panel 22. The second contactor post 36 is disposed substantially perpendicular to the second bus bar 90. The second contactor post 36 and the second bus bar 90 are disposed opposite the first contactor post 30 and the first bus bar 50.

The third contactor lead 38 is connected to the second contactor post 36. The third contactor lead 38 extends from the second contactor post 36 towards a second side of the contactor housing 60 that is disposed opposite the first side of the contactor housing 60. The third contactor lead 38 extends into and is at least partially received within the contactor housing 60. The third contactor lead 38 includes a third contactor lead first end 100, a third contactor lead second end 102, and a third contactor lead body 104 extending between the third contactor lead first end 100 and the third contactor lead second end 102.

The third contactor lead first end 100 is received within the contactor housing 60. The third contactor lead second end 102 is connected to the second contactor post 36. A third contactor pad 106 is disposed on the third contactor lead 38 proximate the third contactor lead first end 100.

The fourth contactor lead 40 is connected to the second contactor post 36. The fourth contactor lead 40 is spaced apart from the third contactor lead 38. The fourth contactor lead 40 extends from the second contactor post 36 towards the second side of the contactor housing 60. The fourth contactor lead 40 extends into and is at least partially received within the contactor housing 60. The fourth contactor lead 40 includes a fourth contactor lead first end 110, a fourth contactor lead second end 112, and a fourth contactor lead body 114 extending between the fourth contactor lead first end 110 and the fourth contactor lead second end 112.

The fourth contactor lead first end 110 is received within the contactor housing 60. The fourth contactor lead second end 112 is connected to the second contactor post 36. A fourth contactor pad 116 is disposed on the fourth contactor lead 40 proximate the fourth contactor lead first end 110.

The actuator assembly 42 is disposed within the contactor housing 60. The actuator assembly 42 is in communication with a control system. The control system is configured to provide a signal to the actuator assembly to open or close the electrical contactor arrangement 20. The actuator assembly 42 includes an actuator 120 and an arm 122 connected to the actuator 120.

The actuator 120 is configured as a linear actuator such as a solenoid or the like. The actuator 120 is configured to move the arm 122 between an extended position and a retracted position. The arm 122 is in the extended position when the actuator 120 is de-energized. The extended position corresponds to the open position of the electrical contactor arrangement 20. The arm 122 is in the retracted position when the actuator 120 is energized. The retracted position corresponds to the closed position of the electrical contactor arrangement 20.

Figure 3:
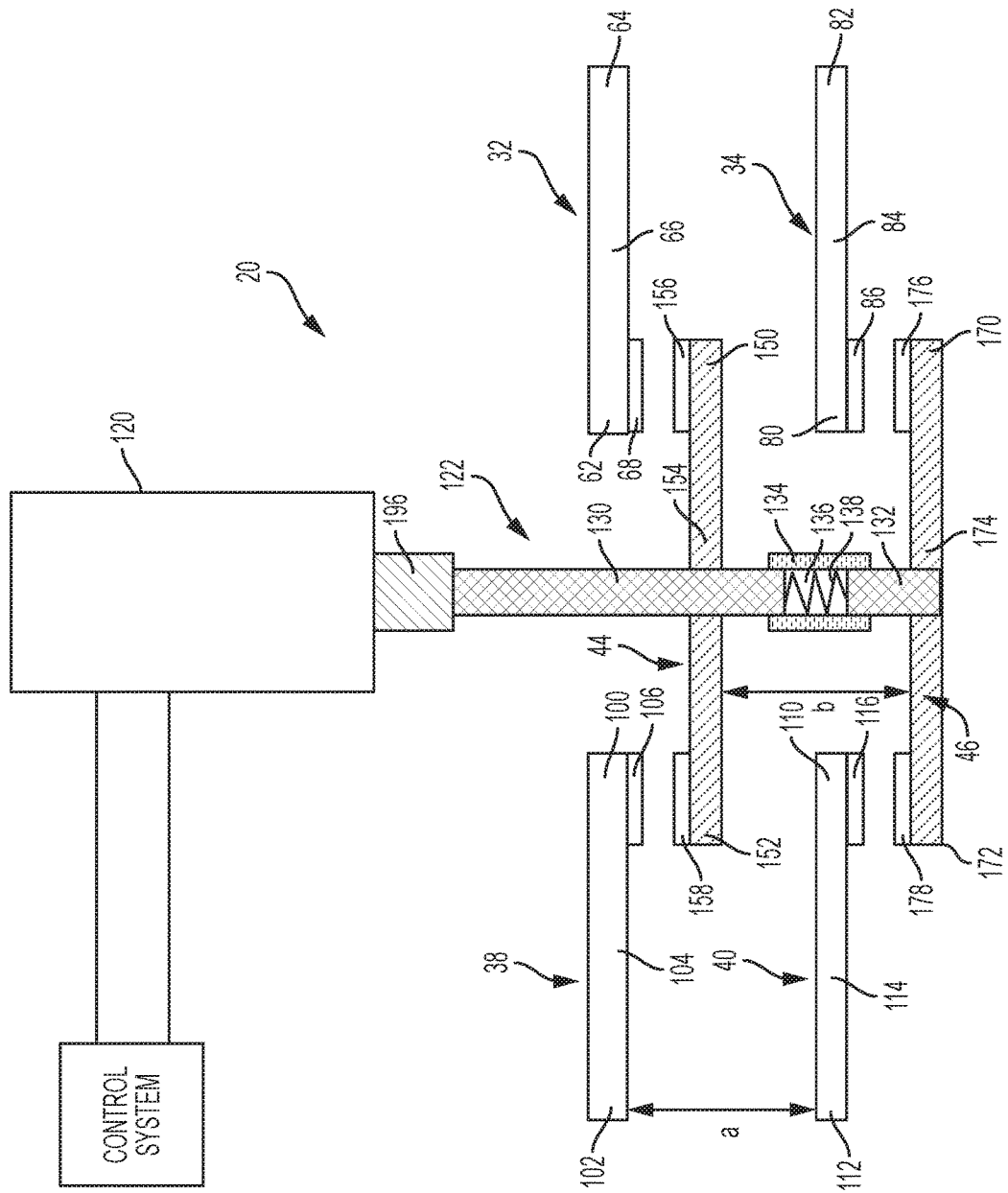
FIG. 3 schematically illustrates an electrical contactor arrangement in an open position.
Figure 4:
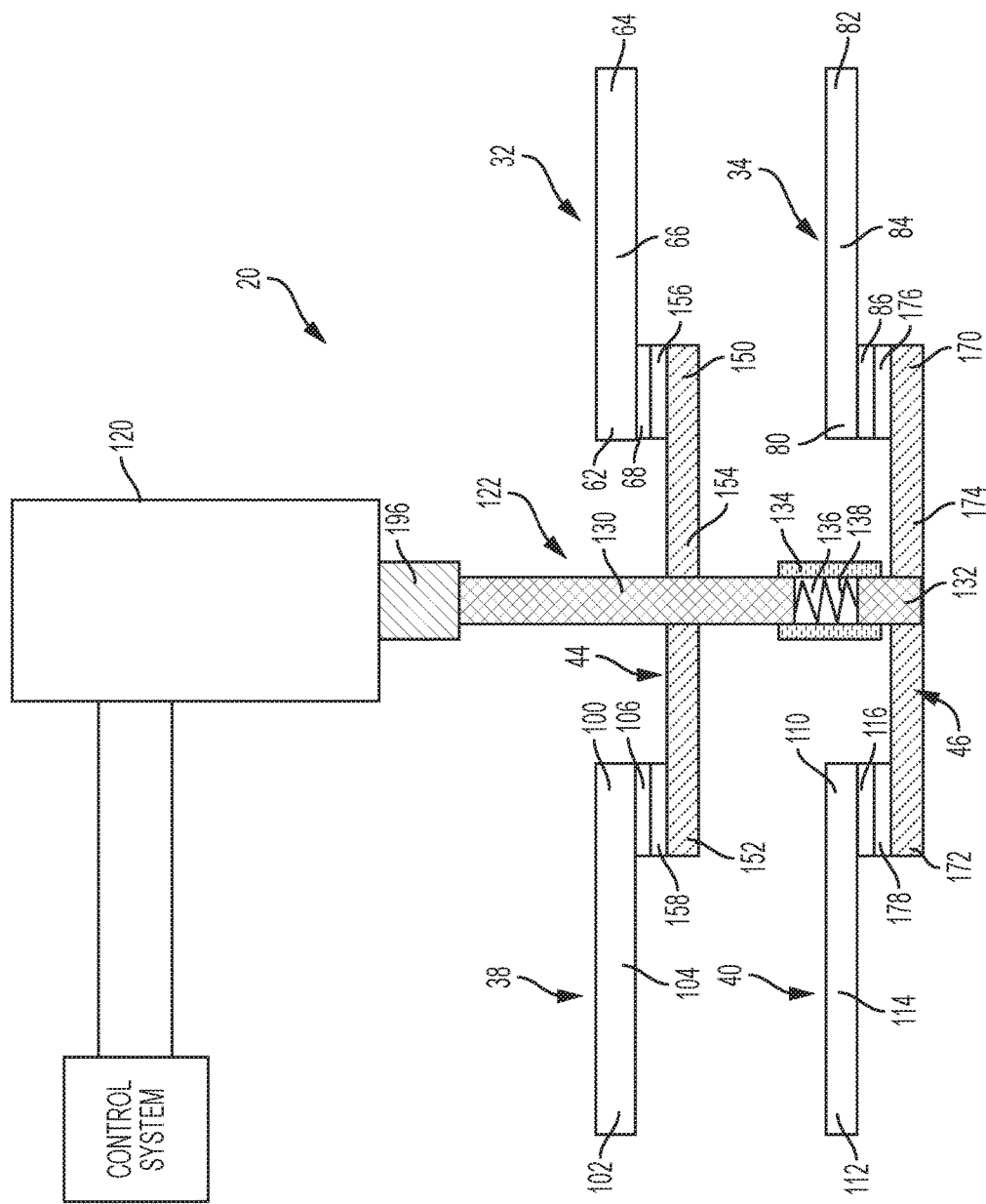
FIG. 4 schematically illustrates the electrical contactor arrangement in a closed position.

The arm 122 extends from the actuator 120. The arm 122 includes a first portion 130 and a second portion 132. The first portion 130 of the arm 122 is disposed closer to the actuator 120 than the second portion 132 of the arm 122. As shown in FIGS. 3 and 4, the first portion 130 is connected to the second portion 132 by a contactor shaft sleeve 134. The contactor shaft sleeve 134 extends between an end of the first portion 130 and an end of the second portion 132. The end of the first portion 130, the end of the second portion 132, and the contactor shaft sleeve 134 define a cavity 136. A biasing member 138 is disposed within the cavity 136. The biasing member 138 engages the end of the first portion 130 and the end of the second portion 132.

Referring to FIGS. 1-4, the first movable contact 44 is coupled to the first portion 130 of the arm 122. The first movable contact 44 is disposed about the first portion 130 of the arm 122, such that the first portion 130 of the arm 122 extends through the first movable contact 44. The first movable contact 44 includes a first movable contact first end 150, a first movable contact second end 152, and a first movable contact body 154 extending between the first movable contact first end 150 and the first movable contact second end 152.

A first movable contact first pad 156 is disposed on the first movable contact 44 proximate the first movable contact first end 150. A first movable contact second pad 158 is disposed on the first movable contact 44 proximate the first movable contact second end 152.

The first movable contact first pad 156 disposed proximate the first movable contact first end 150 is disposed proximate the first contactor pad 68 disposed proximate the first contactor lead first end 62. The first movable contact first pad 156 disposed proximate the first movable contact first end 150 is configured to selectively engage the first contactor pad 68 disposed proximate the first contactor lead first end 62, responsive to the selective energizing and de-energizing of the actuator 120 of the actuator assembly 42.

The first movable contact second pad 158 disposed proximate the first movable contact second end 152 is disposed proximate the third contactor pad 106 disposed proximate the third contactor lead first end 100. The first movable contact second pad 158 disposed proximate the first movable contact second end 152 is configured to selectively engage the third contactor pad 106 disposed proximate the third contactor lead first end 100, responsive to the selective energizing and de-energizing of the actuator 120 of the actuator assembly 42.

The second movable contact 46 is coupled to the second portion 132 of the arm 122. The second movable contact 46 is disposed about the second portion 132 of the arm 122, such that the second portion 132 of the arm 122 extends through the second movable contact 46. The second movable contact 46 is spaced apart from the first movable contact 44. The second movable contact 46 includes a second movable contact first end 170, a second movable contact second end 172, and a second movable contact body 174 extending between the second movable contact first end 170 and the second movable contact second end 172.

A second movable contact third pad 176 is disposed on the second movable contact 46 proximate the second movable contact first end 170. A second movable contact fourth pad 178 is disposed on the second movable contact 46 proximate the second movable contact second end 172.

The second movable contact third pad 176 disposed proximate the second movable contact first end 170 is disposed proximate the third contactor pad 106 disposed proximate the third contactor lead first end 100. The second movable contact third pad 176 disposed proximate the second movable contact first end 170 is configured to selectively engage the third contactor pad 106 disposed proximate the third contactor lead first end 100, responsive to the selective energizing and de-energizing of the actuator 120 of the actuator assembly 42.

The second movable contact fourth pad 178 disposed proximate the second movable contact second end 172 is disposed proximate the fourth contactor pad 116 disposed proximate the fourth contactor lead first end 110. The second movable contact fourth pad 178 disposed proximate the second movable contact second end 172 is configured to selectively engage the fourth contactor pad 116 disposed proximate the fourth contactor lead first end 110, responsive to the selective energizing and de-energizing of the actuator 120 of the actuator assembly 42.

Referring to FIGS. 1 and 2, a first insulator post 190 is disposed about the first portion 130 of the arm 122. The first insulator post 190 is disposed proximate the first movable contact 44. The first insulator post 190 engages a surface of the first movable contact 44.

A second insulator post 192 is spaced apart from the first insulator post 190. The second insulator post 192 is disposed about the second portion 132 of the arm 122. The second insulator post 192 is disposed proximate the second movable contact 46. The second insulator post 192 engages a surface of the second movable contact 46.

Referring to FIGS. 3 and 4, a single insulator post 196 is provided. The single insulator post 196 is disposed about the first portion 130 of the arm 122. The single insulator post 196 is disposed proximate the actuator 120. The single insulator post 196 is spaced apart from and does not engage the first movable contact 44.

Referring to FIGS. 1-4, the first movable contact first pad 156 disposed proximate the first movable contact first end 150 is spaced apart from the first contactor pad 68 disposed proximate the first contactor lead first end 62, while the actuator 120 is de-energized or not energized by the control system. The first movable contact second pad 158 disposed proximate the first movable contact second end 152 is spaced apart from the third contactor pad 106 disposed proximate the third contactor lead first end 100, while the actuator 120 is de-energized or not energized by the control system.

The second movable contact third pad 176 disposed proximate the second movable contact first end 170 is spaced apart from the third contactor pad 106 disposed proximate the third contactor lead first end 100, while the actuator 120 is de-energized or not energized by the control system. The second movable contact fourth pad 178 disposed proximate the second movable contact second end 172 is spaced apart from the fourth contactor pad 116 disposed proximate the fourth contactor lead first end 110, while the actuator 120 is de-energized or not energized by the control system.

A first distance, a, between the third contactor lead 38 and the fourth contactor lead 40 is greater than a second distance, b, between the first movable contact 44 and the second movable contact 46, while the actuator 120 is de-energized or not energized by the control system.

The arm 122 moves from the extended position towards the retracted position responsive to the actuator 120 being energized by the control system to move the electrical contactor arrangement 20 from the open position towards the closed position. The first movable contact first pad 156 disposed proximate the first movable contact first end 150 engages the first contactor pad 68 disposed proximate the first contactor lead first end 62, while the actuator 120 is energized by the control system. The first movable contact second pad 158 disposed proximate the first movable contact second end 152 engages the third contactor pad 106 disposed proximate the third contactor lead first end 100, while the actuator 120 is energized by the control system.

The second movable contact third pad 176 disposed proximate the second movable contact first end 170 engages the third contactor pad 106 disposed proximate the third contactor lead first end 100, while the actuator 120 is energized by the control system. The second movable contact fourth pad 178 disposed proximate the second movable contact second end 172 engages the fourth contactor pad 116 disposed proximate the fourth contactor lead first end 110, while the actuator 120 is energized by the control system.

In the embodiment shown in FIGS. 3 and 4, wherein the first portion 130 of the arm 122 is joined to the second portion 132 of the arm 122 by the contactor shaft sleeve 134 having a biasing member 138, the second movable contact 46 engages the second contactor lead 34 and the fourth contactor lead 40 prior to the first movable contact 44 engaging the first contactor lead 32 and the third contactor lead 38. Responsive to the energizing of the actuator 120, the second movable contact third pad 176 disposed proximate the second movable contact first end 170 engages the third contactor pad 106 disposed proximate the third contactor lead first end 100. The biasing member 138 urges the first movable contact 44 towards the first contactor lead 32 and the second contactor lead 34 such that the first movable contact first end 150 engages the first contactor pad 68 disposed proximate the first contactor lead first end 62 and the first movable contact second pad 158 disposed proximate the first movable contact second end 152 engages the third contactor pad 106 disposed proximate the third contactor lead first end 100.

The energizing of the actuator 120 closes the electrical contactor arrangement 20 such that electrical power is distributed to various subsystems of the aircraft that includes the power distribution system 10. The dual contactor lead arrangement of the electrical contactor arrangement 20, i.e. the first contactor lead 32 and the second contactor lead 34 extending from the first contactor post 30 and the third contactor lead 38 and the fourth contactor lead 40 extending from the second contactor post 36, reduces the operating temperature of the electrical contactor arrangement 20 by reducing contactor losses.

The dual contactor arrangement splits the current flow between a first current flow path defined by the first contactor lead 32 of the first movable contact 44, the third contactor lead 38, and a second current flow path defined by the second contactor lead 34, the second movable contact 46, and the fourth contactor lead 40. The splitting of the current flow (I) between the first current flow path and the second current flow path may result in a 50% reduction in contactor losses and a reduction in operating temperature of the electrical contactor arrangement 20. In general, the contact resistance (R) results in a contact loss of $I^2*R$ with a single contactor arrangement. With the dual contactor arrangement of the electrical contactor arrangement 20 the current flow through each current flow path is I/2 and therefore, the total contact loss is $(I^2*R)/2$. As a result of the reduced contactor temperature because of the dual contactor arrangement of the electrical contactor arrangement 20 a range of power of the power distribution panel 22 may increase. For example, the power distribution panel 22 may be able to provide full power up to a maximum ambient temperature greater than a power distribution panel incorporating a single contactor arrangement.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A power distribution system, comprising:
an electrical contactor arrangement connected to a power distribution panel, the electrical contactor arrangement having:
a first contactor post extending from a first bus bar,
a first contactor lead extending from the first contactor post, the first contactor lead is at least partially received within a contactor housing,
a second contactor lead spaced apart from the first contactor lead, the second contactor lead extending from the first contactor post, the second contactor lead is at least partially received within the contactor housing,
an actuator disposed within the contactor housing,
an arm extending from the actuator,
a first movable contact coupled to the arm, the first movable contact having a first movable contact first end configured to selectively engage a first contactor lead first end,
a second movable contact spaced apart from the first movable contact, the second movable contact coupled to the arm, the second movable contact having a second movable contact first end configured to selectively engage a second contactor lead first end, and
a first insulator post disposed about the arm.

2. The power distribution system of claim 1, wherein the electrical contactor arrangement further comprising:
a second contactor post extending from a second bus bar;
a third contactor lead extending from the second contactor post, the second contactor lead is at least partially received within the contactor housing; and
a fourth contactor lead spaced apart from the third contactor lead, the fourth contactor lead extending from the second contactor post, the fourth contactor lead is at least partially received within the contactor housing.

3. The power distribution system of claim 2, wherein a first movable contact second end is configured to selectively engage a third contactor lead first end.

4. The power distribution system of claim 3, wherein a second moveable contactor lead second end is configured to selectively engage a fourth contactor lead first end.

5. The power distribution system of claim 1, wherein the first insulator post engages a first moveable contactor lead first surface.

6. The power distribution system of claim 2, wherein the electrical contactor arrangement further comprising:
a second insulator post spaced apart from the first insulator post, the second insulator post disposed about the arm.

7. The power distribution system of claim 6, wherein the second insulator post engages a second moveable contactor lead first surface.

8. An electrical contactor arrangement, comprising:
an actuator assembly disposed within a contactor housing, the actuator assembly including an actuator and an arm extending from the actuator, the arm having a first portion and a second portion;
a first movable contact coupled to the first portion of the arm;
a second movable contact coupled to the second portion of the arm;
a first contactor post extending from a first bus bar connected to a power distribution panel;
a first contactor lead extending from the first contactor post, the first contactor lead extending into the contactor housing and disposed proximate a first movable contact first end;
a second contactor lead extending from the first contactor post, the second contactor lead extending into the contactor housing and disposed proximate a second movable contact first end;
a second contactor post extending from a second bus bar connected to the power distribution panel;
a third contactor lead extending from the second contactor post, the second contactor lead extending into the contactor housing and disposed proximate a first movable contact second end; and
a fourth contactor lead extending from the second contactor post, the fourth contactor lead extending into the contactor housing and disposed proximate a second movable contact second end,
a first distance between the second contactor lead and the fourth contactor lead is greater than a second distance between the first movable contact and the second movable contact, while the actuator is not energized.

9. The electrical contactor arrangement of claim 8, wherein responsive to the actuator being energized, the arm moves from an extended position towards a retracted position such that the second movable contact first end engages the second contactor lead and the second movable contact second end engages the fourth contactor lead prior to the first movable contact first end engaging the first contactor lead and the first movable contact second end engaging the third contactor lead.

10. The electrical contactor arrangement of claim 9, wherein a biasing member urges the first movable contact first end towards the first contactor lead and the first movable contact second end towards the third contactor lead, while the arm moves from the extended position towards the retracted position.

11. The electrical contactor arrangement of claim 9, further comprising a first insulator post disposed about the first portion and disposed proximate the first movable contact.

* * * * *